United States Patent
Schulde et al.

(10) Patent No.: US 11,424,649 B2
(45) Date of Patent: Aug. 23, 2022

(54) INTERNAL ROTOR WITH ROTOR PLATE HAVING SPRUNG WEB-SHAPED CLAMPING ELEMENT TO CLAMP THE MAGNET AND TWO RECESSES

(71) Applicant: EBM-PAPST ST. GEORGEN GMBH & CO. KG, St. Georgen (DE)

(72) Inventors: Arnold Schulde, VS-Schwenningen (DE); Juergen Herr, St. Georgen (DE); Johannes Fehrenbach, Unterkirnach (DE); Markus Flaig, Hardt (DE); Christoph Mayer, St. Georgen (DE); Serkan Poyraz, VS-Villingen (DE); Bozidar Radjenovic, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 464 days.

(21) Appl. No.: 16/468,991

(22) PCT Filed: Feb. 9, 2018

(86) PCT No.: PCT/EP2018/053318
§ 371 (c)(1),
(2) Date: Nov. 15, 2019

(87) PCT Pub. No.: WO2018/153700
PCT Pub. Date: Aug. 30, 2018

(65) Prior Publication Data
US 2020/0106314 A1   Apr. 2, 2020

(30) Foreign Application Priority Data
Feb. 22, 2017 (DE) .................. 10 2017 103 619.9

(51) Int. Cl.
*H02K 1/276* (2022.01)

(52) U.S. Cl.
CPC ......... *H02K 1/276* (2013.01); *H02K 2213/03* (2013.01)

(58) Field of Classification Search
CPC .... H02K 1/276; H02K 1/2766; H02K 1/2773; H02K 2213/03
(Continued)

(56) References Cited

U.S. PATENT DOCUMENTS 4,434,546 A * 3/1984 Hershberger ........ H02K 1/2766
29/418
5,666,015 A * 9/1997 Uchibori .................. H02K 7/04
310/156.53
(Continued)

FOREIGN PATENT DOCUMENTS

CN      10 5075 070 A    11/2015
DE   10 2005 041 676 A1   3/2007
(Continued)

OTHER PUBLICATIONS

DE102005041676A1 English Translation.*
(Continued)

*Primary Examiner* — Maged M Almawri
(74) *Attorney, Agent, or Firm* — Dickinson Wright PLLC

(57) ABSTRACT

An internal rotor for an electric motor has a laminated rotor core with a multiplicity of rotor plates, and multiple pockets in each of which pocket a rotor magnet is at least partially arranged. The rotor plates have first recesses for forming the pockets and at least a first rotor plate which has at least a second recess associated with a first recess. A sprung web-shaped clamping element is formed between the second recess and the associated first recess, and tensioned toward the second recess by the associated rotor magnet to apply a force to the associated rotor magnet toward the first recess in order to hold the associated rotor magnet in the pocket. A (Continued)

Figure 1:
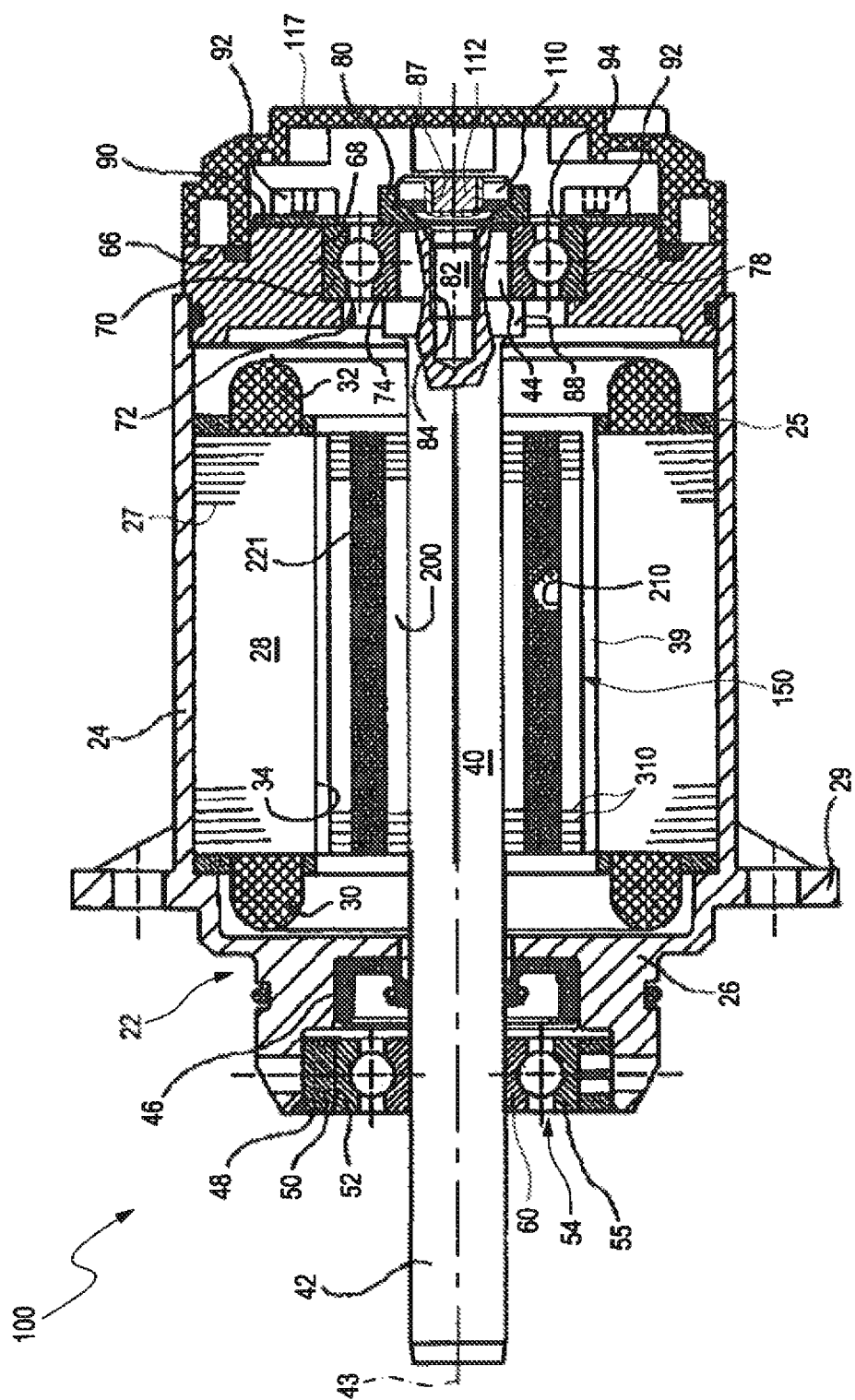

rotor plate holds a rotor magnet in a pocket of a laminated rotor core.

24 Claims, 12 Drawing Sheets

(58) Field of Classification Search
USPC ............ 310/156.56, 156.57, 156.53, 156.22, 310/156.16, 216.044
See application file for complete search history.

(56) References Cited

U.S. PATENT DOCUMENTS

| | | | | |
|---|---|---|---|---|
| 5,684,352 A * | 11/1997 | Mita | ................ | H02K 1/02 310/152 |
| 5,864,191 A * | 1/1999 | Nagate | ................ | H02K 1/276 310/216.106 |
| RE36,367 E * | 11/1999 | Nagate | ................ | H02K 11/012 310/152 |
| 6,208,054 B1 * | 3/2001 | Tajima | ................ | H02K 29/03 310/156.53 |
| 6,340,399 B1 * | 1/2002 | Tanaka | ................ | C22C 38/002 148/308 |
| 6,597,079 B2 * | 7/2003 | Miyashita | ............. | H02K 1/276 310/156.48 |
| 6,707,206 B2 * | 3/2004 | Chang | ................ | H02K 1/278 310/156.01 |
| 7,098,564 B2 * | 8/2006 | Gehring | ............. | H02K 15/14 310/154.03 |
| 7,652,404 B2 * | 1/2010 | El-Refaie | ............ | H02K 1/246 310/216.007 |
| 8,179,011 B2 * | 5/2012 | Takemoto | ............ | H02K 21/16 310/156.53 |
| 8,247,940 B2 * | 8/2012 | Hino | ................ | B60L 15/007 310/156.47 |
| 8,368,273 B2 * | 2/2013 | Hino | ................ | B60L 50/61 310/156.47 |
| 8,405,269 B2 * | 3/2013 | Spaggiari | ............ | H02K 1/276 310/156.53 |
| 8,714,948 B2 * | 5/2014 | Baba | ................ | H02K 21/16 310/216.106 |
| 9,431,882 B2 * | 8/2016 | Evans | ................ | H02K 3/487 |
| 9,979,246 B2 * | 5/2018 | Helbling | ............. | H02K 1/30 |
| 10,396,609 B2 * | 8/2019 | Mae | ................ | H02K 1/2766 |
| 10,530,204 B2 * | 1/2020 | Roopnarine | ......... | H02K 1/2766 |
| 10,547,221 B2 * | 1/2020 | Lee | ................ | H02K 1/2766 |
| 10,749,391 B2 * | 8/2020 | Degner | ............. | H02K 1/02 |
| 10,770,960 B2 * | 9/2020 | Xiao | ................ | H02K 29/03 |
| 2001/0031216 A1 * | 10/2001 | Kohara | ............. | B22F 3/03 419/66 |
| 2002/0041127 A1 * | 4/2002 | Naito | ................ | H02K 1/2766 310/156.01 |
| 2003/0201685 A1 * | 10/2003 | Shimada | ............. | H02K 15/03 310/156.53 |
| 2007/0108169 A1 * | 5/2007 | Shimada | ............. | H02K 15/03 310/156.53 |
| 2009/0001839 A1 * | 1/2009 | Masayuki | ............ | H02K 29/08 310/156.16 |
| 2010/0187944 A1 * | 7/2010 | Ossenkopp | ........... | H02K 1/28 310/216.049 |
| 2010/0308680 A1 * | 12/2010 | Yamada | ............. | H02K 1/2746 310/156.54 |
| 2013/0307363 A1 * | 11/2013 | Sano | ................ | H02K 1/27 310/156.01 |
| 2014/0062243 A1 * | 3/2014 | Falk | ................ | H02K 1/22 310/156.08 |
| 2014/0167550 A1 * | 6/2014 | Huang | ................ | H02K 1/2766 310/156.19 |
| 2014/0225469 A1 * | 8/2014 | Yoshikawa | ........... | H02K 15/03 310/156.53 |
| 2014/0327329 A1 * | 11/2014 | Kitada | .............. | C08G 59/688 310/43 |
| 2015/0001979 A1 * | 1/2015 | Deguchi | ............ | H02K 21/24 310/156.37 |
| 2015/0256038 A1 * | 9/2015 | Nigo | ................ | F25B 31/026 310/156.57 |
| 2015/0303749 A1 * | 10/2015 | Okubo | ............... | H02K 21/14 310/156.38 |
| 2016/0065015 A1 * | 3/2016 | Kameda | ............. | H02K 15/03 29/598 |
| 2020/0177038 A1 * | 6/2020 | Froöhlich | ........... | H02K 15/12 |

FOREIGN PATENT DOCUMENTS

| | | | | |
|---|---|---|---|---|
| DE | 102005041676 A1 * | 3/2007 | ............ | H02K 1/276 |
| DE | 102005041676 A1 | 3/2007 | | |
| DE | 102007029719 A1 | 8/2008 | | |
| DE | 102011101730 A1 | 12/2011 | | |
| DE | 102012016927 A1 | 2/2014 | | |
| DE | 10 2015 207 663 A1 | 10/2016 | | |
| DE | 102015207663 A1 * | 10/2016 | | |
| DE | 102015207663 A1 | 10/2016 | | |
| EP | 2306620 A2 * | 4/2011 | ............ | H01F 1/0577 |
| WO | 2008065146 A1 | 6/2008 | | |
| WO | 2014147102 A2 | 9/2014 | | |

OTHER PUBLICATIONS

DE-102015207663-A1 English Translation.*
International Search Report and Written Opinion dated Apr. 10, 2018, which issued in corresponding Patent Application No. PCT/EP2018/053318.
Chinese Office Action dated Oct. 10, 2020, which issued in the corresponding Chinese Patent Application No. 201880004308.X.

* cited by examiner

INTERNAL ROTOR WITH ROTOR PLATE HAVING SPRUNG WEB-SHAPED CLAMPING ELEMENT TO CLAMP THE MAGNET AND TWO RECESSES

The invention relates to an electric motor, an internal rotor and a rotor plate.

Electric motors of the internal rotor motor type have an external stator and a rotating internal rotor with permanent magnets arranged in the external stator.

Due to their low axial moment of inertia, such internal rotor motors are used, for example, for drive tasks, wherein an electric motor must very rapidly comply with electric commands in terms of its movements, for example, as a servomotor. In such a motor, the permanent magnets of the internal rotor, which are arranged in a laminated core associated with the internal rotor, must not rattle and must not shift in axial direction even at higher rotation speeds, i.e., they must be fastened securely in axial and radial direction in a laminated core. In the automotive sector, for example, for extreme application areas, it is required that the magnets remain firmly in the internal rotor in the case of impacts with an acceleration of 50 g. For this purpose, the permanent magnets can be glued into the laminated core, or, in each case, a suitable retaining washer covering the magnets can be fastened at both ends of the laminated core. In addition, the laminated core can also be embedded in synthetic resin, wherein all these methods require additional work steps, time and also auxiliary materials. During the gluing, special work sites with suctioning, etc., are necessary.

DE 10 2011 101 730 A1 presents an internal rotor motor, wherein the permanent magnets are clamped elastically in an associated laminated core. This occurs in that, by means of a tool, holding sections provided on the external periphery of the laminated core are pressed (notched, imprinted) radially inward. In this way, a sprung pressing (notching, imprinting) is achieved, which in each case applies a spring force F acting radially inwardly in the direction of an associated recess in which a permanent magnet of the internal rotor is arranged, so that said permanent magnet is clamped into the recess. The disadvantage here is that the sprung pressing (notching, imprinting) can spring back over the useful life of the internal rotor motor, so that the permanent magnets can become loose in the recesses and thus rattle or fall out of the recesses.

DE 10 2007 029 719 A1 presents an internal rotor motor, wherein, on corresponding recesses of a laminated core associated with the internal rotor, in each case a sprung projection is provided, which in the unloaded state is deflected into a respective associated recess. This sprung projection is connected on one side to the laminated core, and the other end is free. During the insertion of a corresponding permanent magnet into the recess, the sprung projection is subjected to force by the permanent magnet and thus elastically deformed. In this way, after the insertion of the permanent magnet into the recess, the sprung projection for its part can exert an associated spring force F against the permanent magnet, which clamps said permanent magnet in the recess. However, it is also possible that the sprung projections spring back over the useful life of the internal rotor motor, so that, even during the use of these sprung projections, the permanent magnets can become loose in the recesses and thus rattle or fall out of the recesses.

DE 10 2012 016 927 A1 discloses an internal rotor for an electric motor, wherein the rotor magnets are fastened via a clamping element. An additional component is needed, which also increases the costs.

WO 2014/147102 A2 discloses an internal rotor motor with a laminated core which has at least a first recess and at least a second recess. A rotor magnet arranged in the first recess is fastened in that a clamping member is introduced into the second recess and as a result a clamping element arranged between the recesses is deformed and subjected to a force directed toward the rotor magnet. However, this solution requires additional components or a complex design of the laminated core. In addition, an internal rotor motor with a laminated core is disclosed, wherein, by means of the shaft oversize, a radial force is applied to the rotor magnets via a clamping element integrated in the laminated core. Due to the complicated plate geometry, this solution is poorly suited for small rotor diameters. In addition, high tensile stresses occur in the laminated core.

Therefore, an aim of the present invention is to provide a novel electric motor, a novel internal rotor and a novel rotor plate. This aim is achieved by the subject matter of the independent claims. Preferred embodiments are the subject matter of the dependent claims.

In particular, the aim of the present invention is achieved by an internal rotor and a rotor plate according to the claims. Thereby, a secure holding of the rotor magnet is made possible, and the above-described rebound can be prevented.

Figure 2:
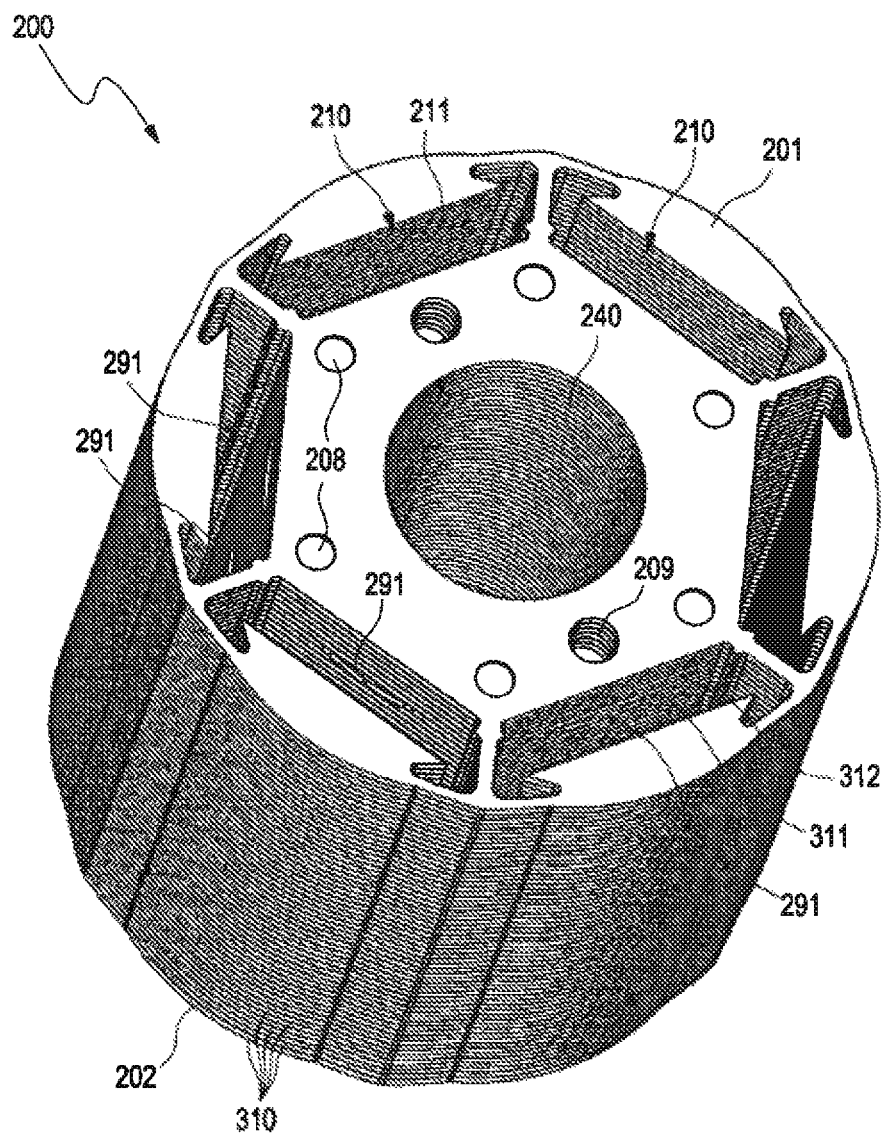
Figure 3:
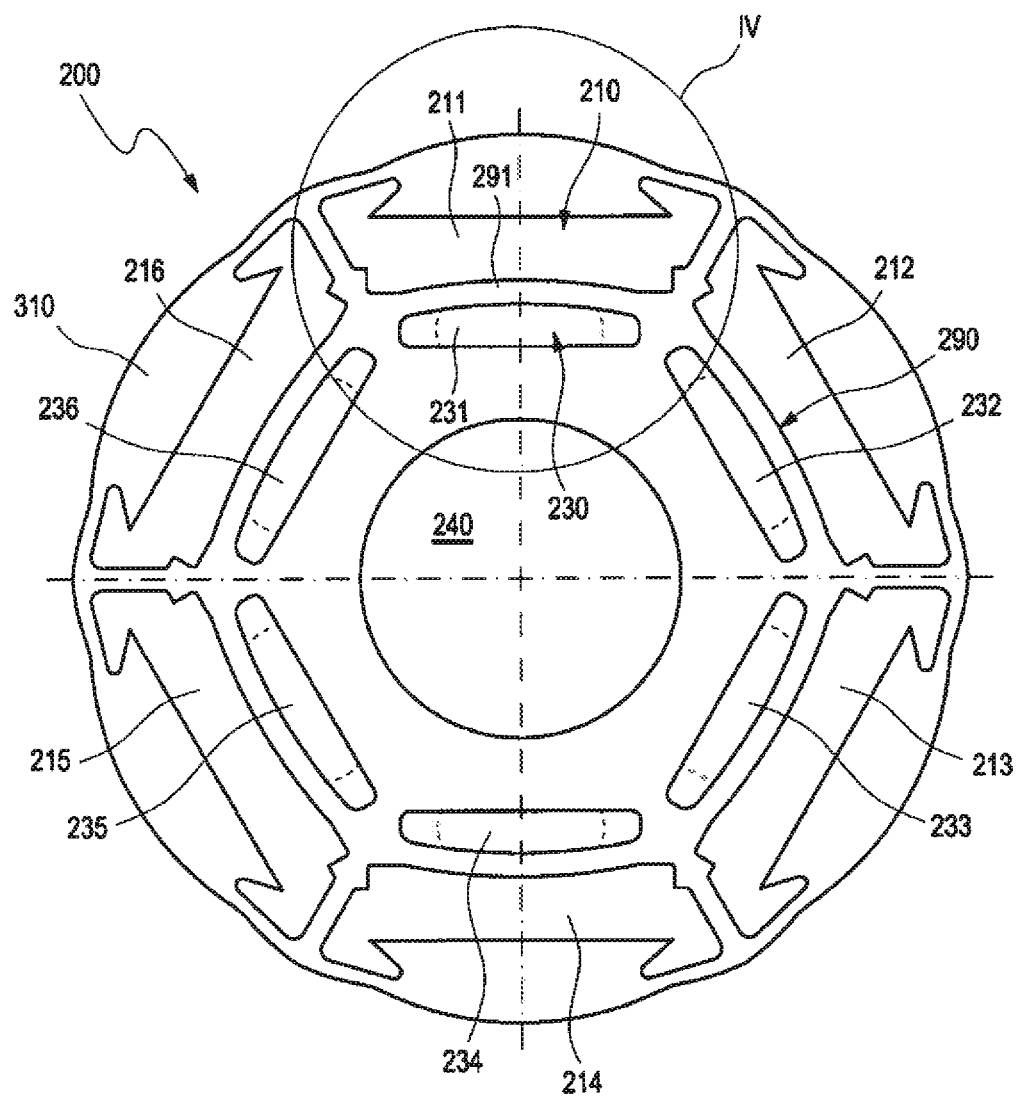
Figure 4:
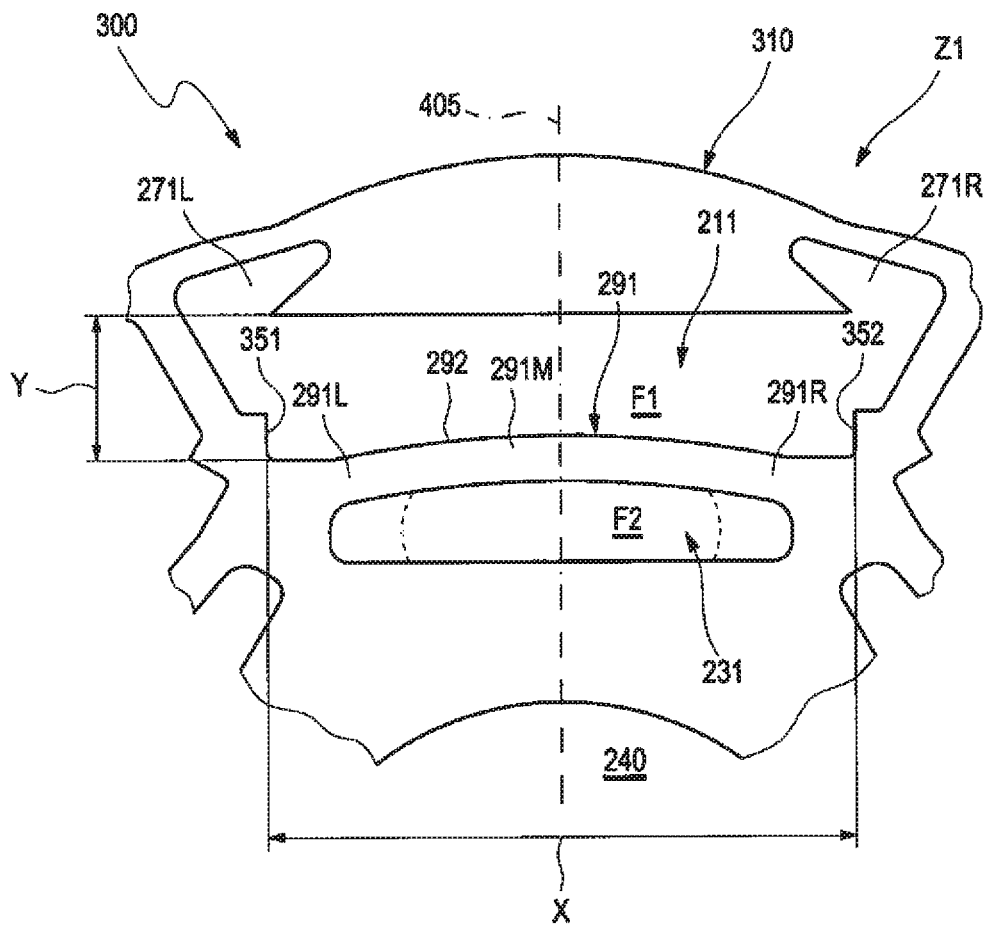
Figure 5:
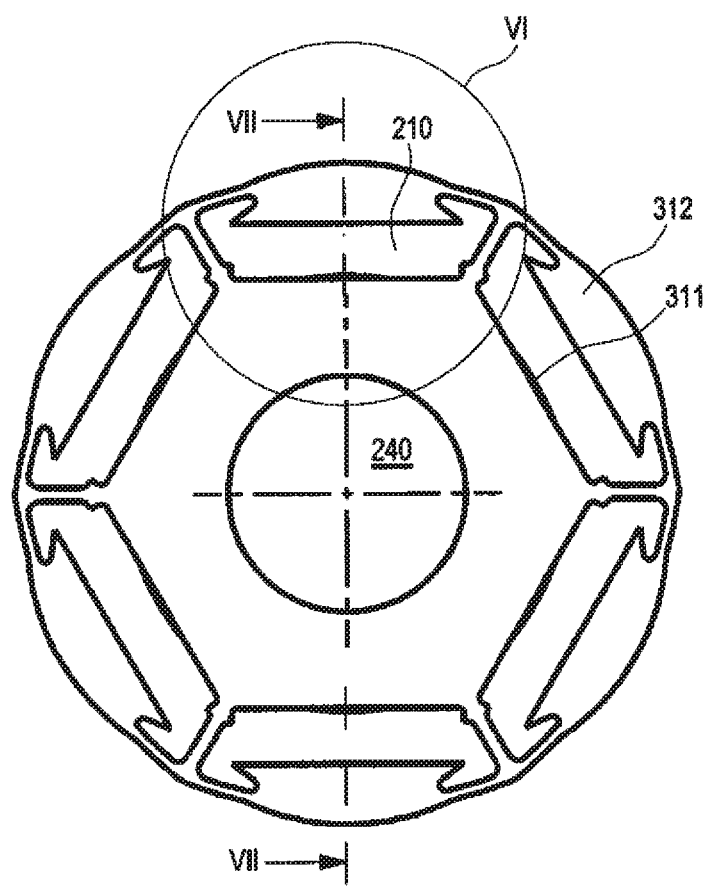
Figure 6:
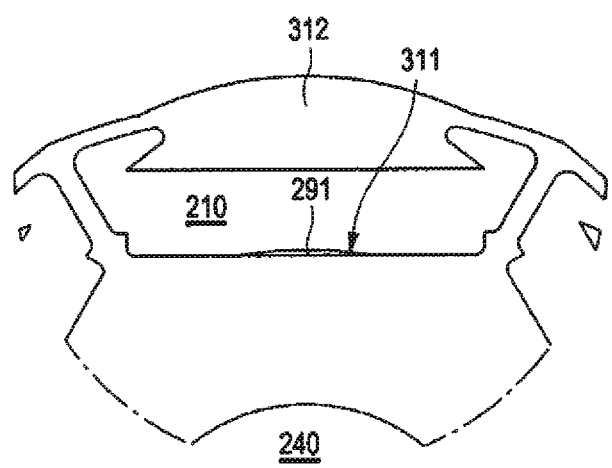
Figure 7:
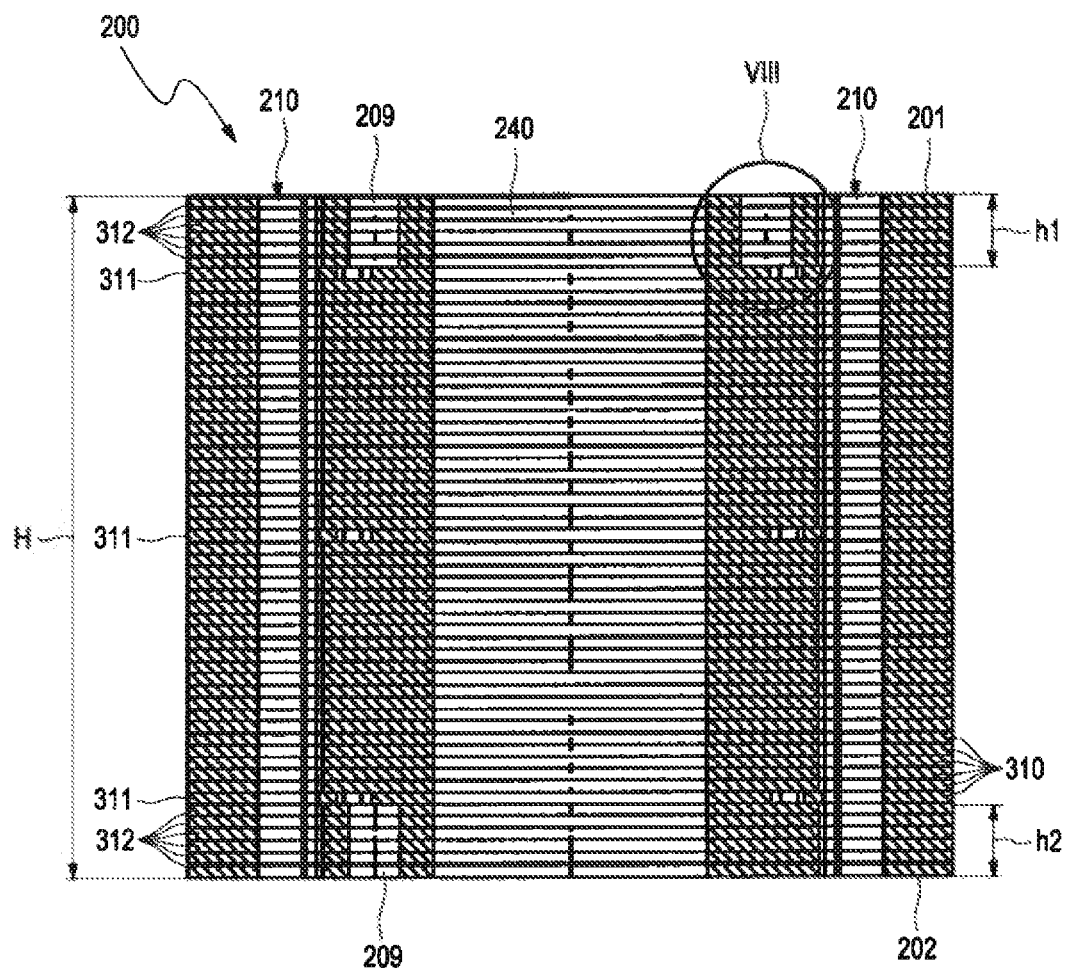
Figure 8:
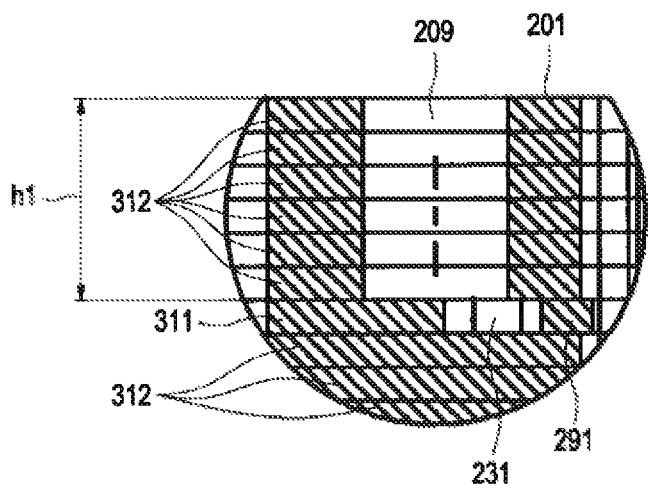
Figure 9:
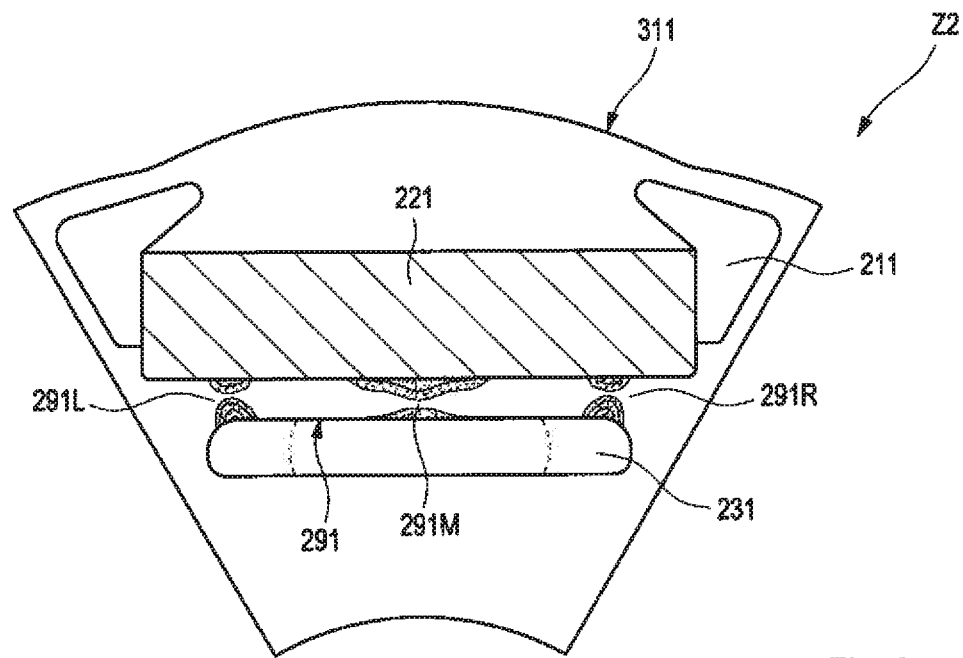
Figure 10:
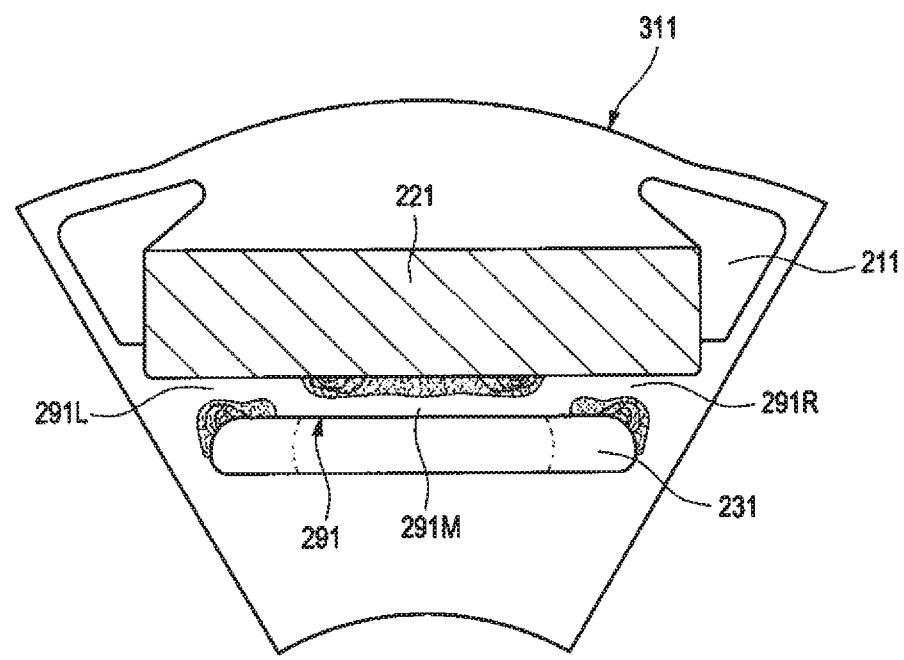
Figure 11:
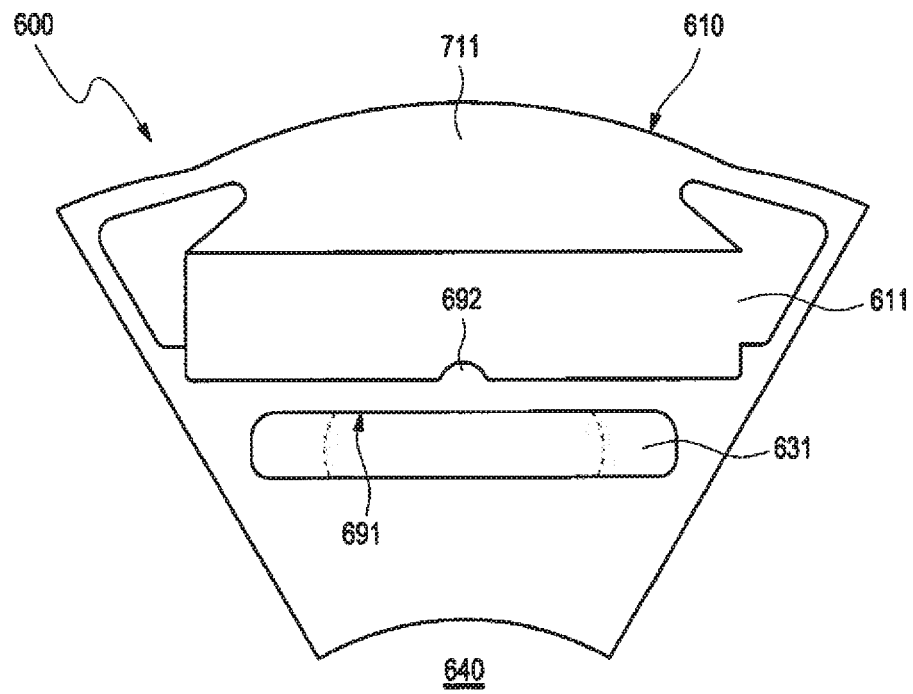
Figure 12:
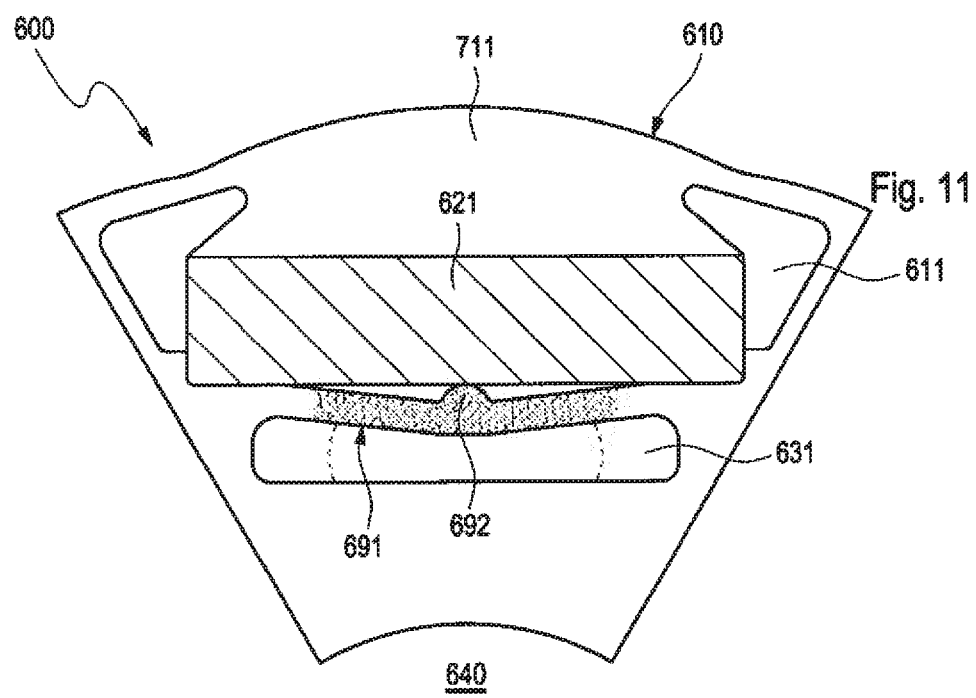
Figure 13:
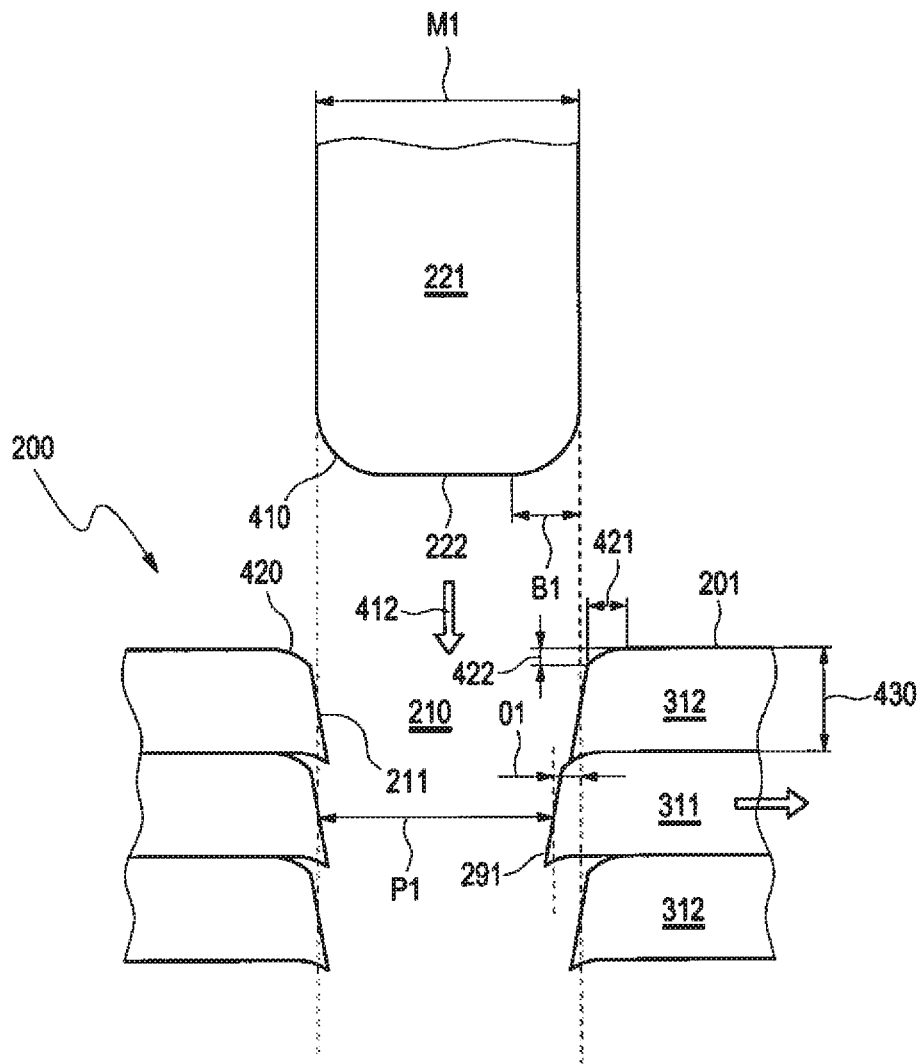
Figure 14:
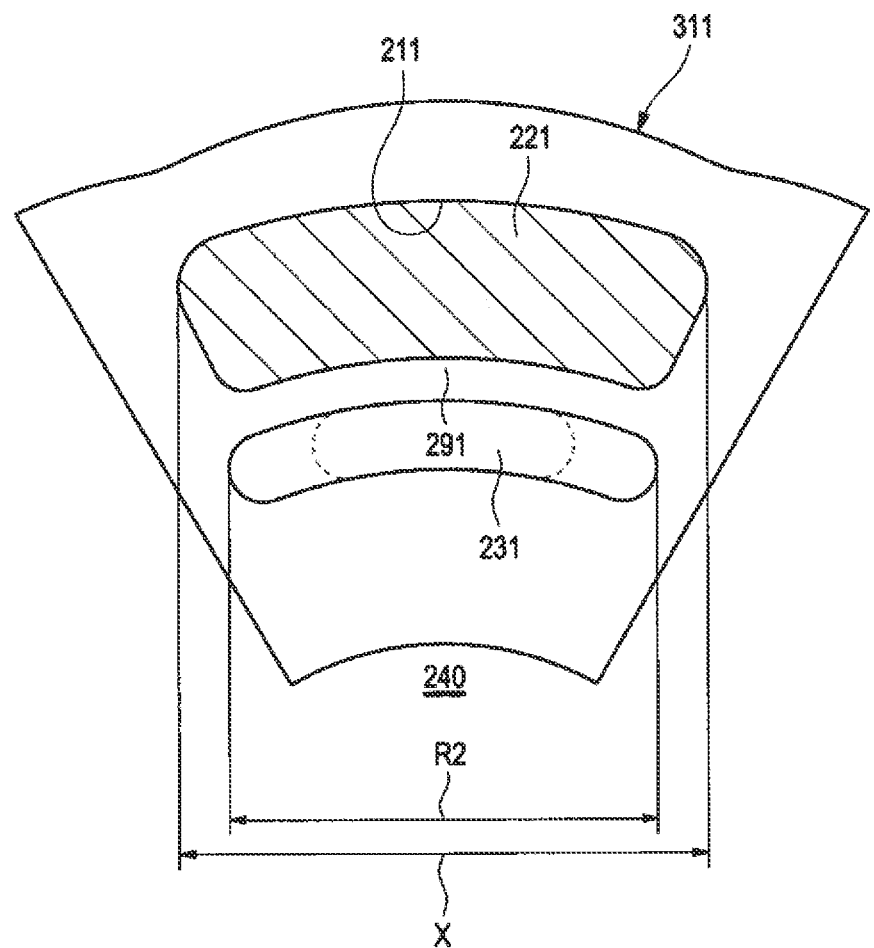
Figure 15:
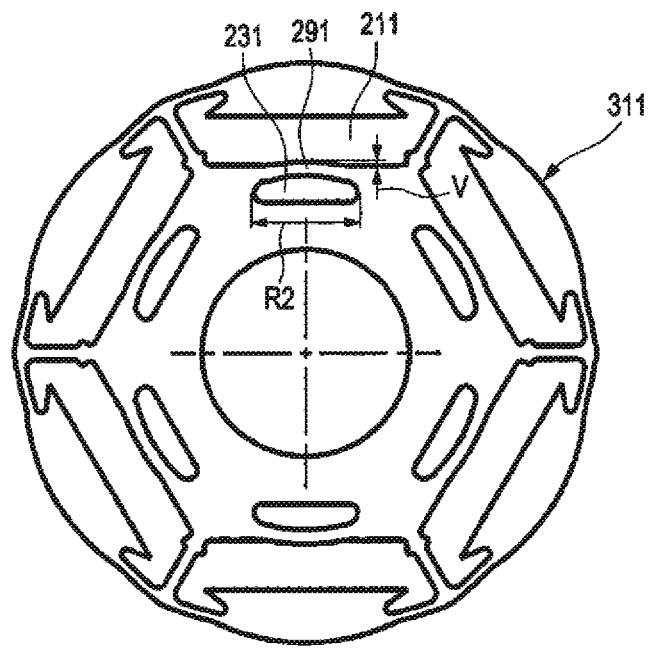
Figure 16:
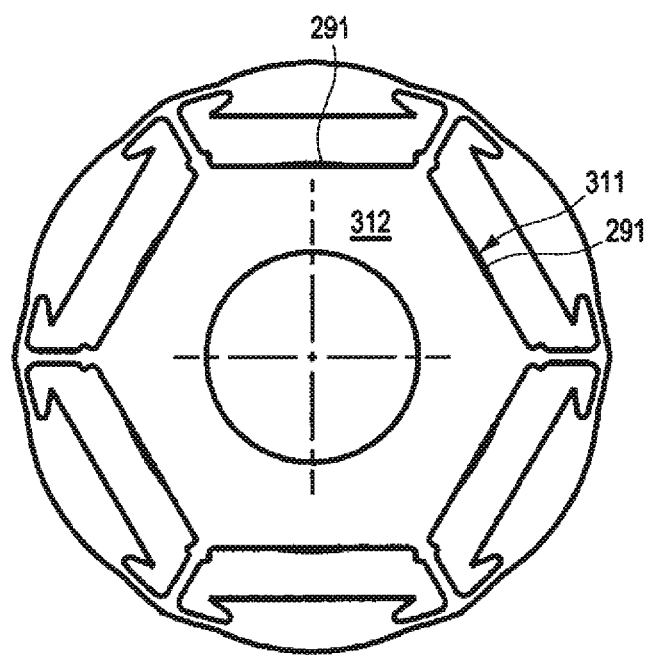
Figure 17:
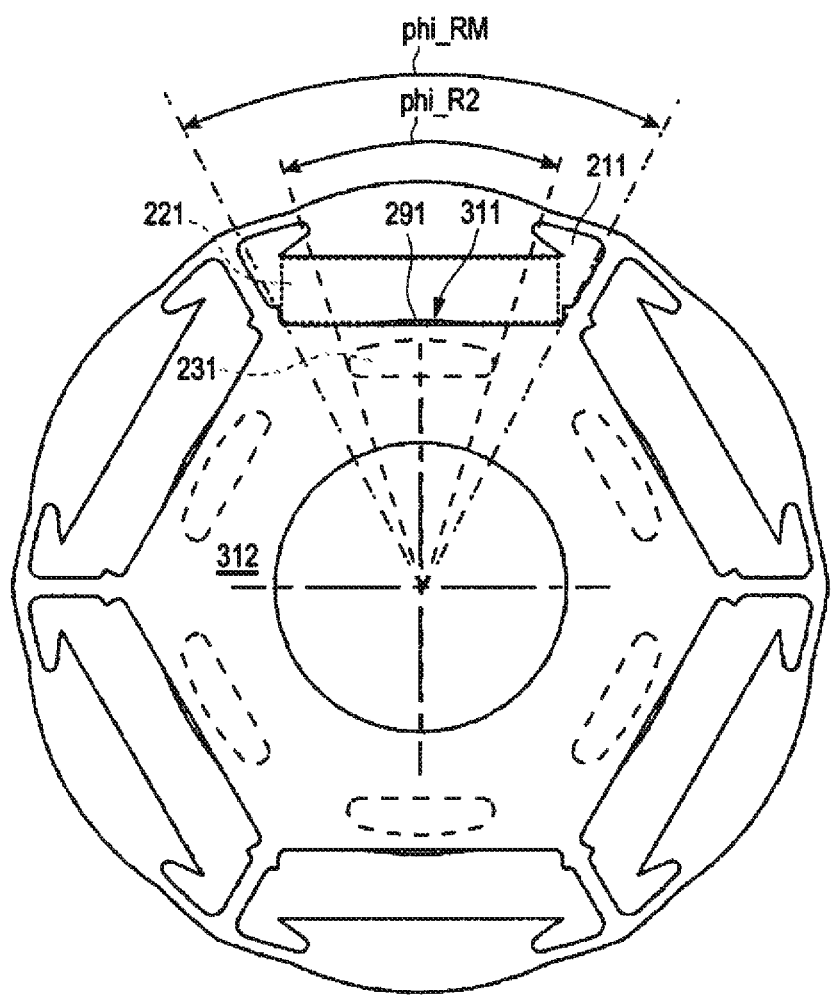

Additional details and advantageous developments of the invention result from the embodiment examples described below and represented in the drawings in a manner which in no way should be understood to limit the invention. The drawings show:

FIG. 1 a longitudinal section through an electric motor according to the invention provided with an internal rotor and an external stator;

FIG. 2 a laminated core of the internal rotor of FIG. 1 with first rotor plates and second rotor plates, in a three-dimensional representation;

FIG. 3 a view onto the first rotor plate of FIG. 2 according to a first embodiment;

FIG. 4 an enlarged view of a section IV of FIG. 3 with a clamping element according to a first embodiment;

FIG. 5 in a top view, a second rotor plate and a first rotor plate arranged underneath;

FIG. 6 an enlarged view of a section VI of FIG. 5;

FIG. 7 a longitudinal section through the internal rotor of FIG. 2;

FIG. 8 an enlarged view of a section VIII of FIG. 7;

FIG. 9 a section of a view of the laminated core of FIG. 2 with associated rotor magnet, wherein the plastic strain caused by the rotor magnet is illustrated;

FIG. 10 a section of a view of the laminated core of FIG. 2 with associated rotor magnet, wherein the hydrostatic stress state in the laminated core is illustrated;

FIG. 11 a section of a view of the laminated core of the internal rotor of FIG. 1 according to a second embodiment;

FIG. 12 the section of FIG. 11 with associated rotor magnet;

FIG. 13 a diagrammatic representation of the pressing of a rotor magnet into the pocket;

FIG. 14 a section of the laminated core of the internal rotor of FIG. 1 with first and second recesses according to a third embodiment;

FIG. 15 a view onto the first rotor plate of FIG. 2 in a fourth embodiment;

FIG. 16 a view onto a second rotor plate and an underlying first rotor plate according to FIG. 15; and FIG. 17 a view according to FIG. 16 with illustration of the position of second recesses.

In the following description, the terms left, right, top and bottom refer to the respective figure of the drawings and can vary as a function of a respective selected orientation (vertical format or horizontal format) from one figure of the drawings to the next. Identical or equivalent parts are referred to with the same reference numerals in the various figures and are usually described only once.

Basic Structure of an Internal Rotor Motor

FIG. 1 shows an electric motor 100 provided in a housing 22, which is preferably designed in the manner of an electronically commutated internal rotor motor. Said electric motor has an external stator 28 arranged in the housing 22 and an internal rotor 150 rotatably arranged in the external stator 28. This internal rotor is separated from the external stator 28 by a magnetically acting air gap.

The housing 22 has, for example, a cylindrical housing portion 24, a type A bearing plate 26 and a fastening shoulder 29. In the cylindrical housing portion 24, a stator core 27 of the external stator 28 is arranged, and the winding heads of the stator core 27 are indicated with the reference numerals 30 and 32. The stator core 27 is designed as laminated core 27 with a multiplicity of plates or plate laminations—indicated only diagrammatically—and is referred to below as "laminated stator core 27" for a better understandability of the description. This laminated stator core 27 can be embedded in a winding or insulation body 25 which can be formed, for example, in the manner of a plastic overmolding.

In addition, the external stator 28 has an internal recess 34, in which a rotor core 200 of the internal rotor 150, which is provided with at least a rotor magnet and preferably a multiplicity (for example, 2, 4, 6, 8) of rotor magnets 221, is arranged. This rotor core 200 is designed in the embodiment examples as a laminated core with a multiplicity of plates or plate laminations 310, so that it is referred to below as "laminated rotor core 200" to improve the understandability of the description. It has at least a first pocket and preferably a multiplicity of first pockets 210 for receiving the rotor magnets 221, in which the rotor magnets 221 are arranged. According to an embodiment, these rotor magnets are permanent magnets.

The laminated rotor core 200 is arranged on a rotor shaft 40 which is preferably pressed into the laminated rotor core 200. The rotor shaft 40 has a free external drive end 42 and an internal shaft end 44 and it is designed for a rotation around a rotation axis 43.

For the rotor shaft 40, in the A type bearing plate 26, a gasket 46 is provided. Furthermore, a recess 48 is located there, wherein a guide element 50 for an external ring 55 of a roller bearing 54 is fastened. In the area of the drive end 42, an internal ring 60 of this roller bearing 54 is arranged around the rotor shaft 40, preferably pressed onto it.

The internal shaft end 44 of the rotor shaft 40 is arranged in a B type bearing plate 66 which is fastened to an open end of the cylindrical housing 24, opposite the A type bearing plate 26. The B type bearing plate 66 has a recess 68 provided with an annular shoulder 78 for an external ring 70 of a roller bearing 72, the internal ring 74 of which is fastened onto the shaft end 44. For this purpose, the rotor shaft 40 has an annular collar 88, with which it is in contact with a side—on the left in FIG. 1—of the internal ring 74. Against the side—on the right in FIG. 1—of said internal ring a molded part 80 made of brass, for example, abuts, which is pressed by a countersunk head 110 of a countersunk head screw 82 in the direction of the rotor shaft 40 and is designed to be approximately annular. The screw 82 is screwed into an internal threading 84 of the shaft end 44 and as a result presses the molded part 80 in the direction of the internal ring 74. For the secure clamping of the external ring 70 of the roller bearing 72, a preferably flat annular part 90 is used, which is fastened by several evenly distributed screws 92, for example, three screws 92, on its external periphery to the B type bearing plate 66, and which is in contact by its radial internal periphery 94 with the external ring 70 and presses said external ring—to the left in FIG. 1—against the collar 78.

In a recess 87 of the screw head 110, a control magnet 112 is preferably fastened. This control magnet is provided, for example, on its side—on the right in FIG. 1—with a magnetization pattern and is used for controlling magnetoresistive resistors which are arranged on a housing cover 117 and used for the capturing of a respective rotation position of the internal rotor 150, in order to be able to exactly control the shape and commutation of motor currents in the external stator 28. The housing cover 117 is fastened to the B type bearing plate 66 and is preferably used for the sealed closing of the housing 22.

Reference is also made to the fact that the above-described electric motor 100 can be referred to not only as an electronically commutated internal rotor motor, but also differently. For example, the electric motor 100 can be referred as a permanently excited synchronous internal rotor machine or as an electronically commutated motor, or as an electric motor with permanent magnetic excitation.

The electric motor 100 can also be of different design and, in particular, in the case of very small electric motors 100, other bearings and a different mounting of the bearings can be used, for example, injection molded bearings.

Laminated Rotor Core with Clamping Elements

FIG. 2 shows the laminated rotor core 200 of the internal rotor 150 of FIG. 1 in a three-dimensional representation. The laminated rotor core 200 has a first axial end 201 and a second axial end 202 opposite the first axial end 201. Six pockets 210 are provided for the arrangement of the rotor magnets 221 (compare FIG. 1). The laminated rotor core 200 has rotor plates 310 and these rotor plates have first recesses 211 for the formation of the pockets 210. In the center, a passage opening 240 is formed for receiving the rotor shaft 40 of FIG. 1. In the pockets 210, clamping elements 291 which protrude into the pockets 210 are provided. In the left pocket, two clamping elements 291 can be seen.

The rotor plates 310 of the laminated rotor core 200 comprise first rotor plates 311 and second rotor plates 312, wherein the clamping elements 291 are provided on the first rotor plates 311.

Preferably, the rotor plates 310 have at least a centering index recess 209, in order to enable a predetermined arrangement of the rotor plates 310, in particular for centering the laminated rotor core 200.

On the first axial side 201, depressions 208 are indicated, which are formed by imprinting the rotor plates 310. By such imprinting, the rotor plates 310 are preferably connected to one another.

The multiplicity of recesses 211 and the passage opening 240 for receiving a shaft and optionally additional recesses such as the second recesses 230 of FIG. 3 can be formed by stamping or by laser cutting. The rotor plates 310 can be fastened to one another for the formation of the laminated rotor core 200 in any desired manner, for example, by welding and/or stamping.

FIG. 3 shows the first rotor plate 311 of the laminated rotor core 200 of FIG. 2. The laminated rotor core 200 is provided with a multiplicity of first recesses 211-216 for receiving a multiplicity of rotor magnets 221, wherein the multiplicity of first recesses 211-216 as an illustration comprises six recesses 211, 212, 213, 214, 215, 216. For example, 2, 4, 8 or more first recesses 211 can also be provided. In each first recess 211, preferably exactly one rotor magnet 221 is arranged; however, a plurality thereof can also be arranged. The associated number of stator poles is dependent on the motor type (single-phase or three-phase). Each of the first recesses 211 in each case accommodates a rotor magnet of the multiplicity of rotor magnets 221, for example, the first recess 211 comprises the rotor magnet 221. The laminated rotor core 200 moreover comprises a multiplicity of second recesses 230, wherein the multiplicity of second recesses 230 as an illustration comprises six recesses 231, 232, 233, 234, 235, 236. The second recesses 230 are in each case adjacent to the corresponding first recesses 211 to 216 in radial direction. For example, the first recess 211 is adjacent to the second recess 231 in radial direction, etc.

In the second recesses 230, or 231 to 236, an alternative embodiment with smaller angular extent is represented with dashed lines. In accordance with the alternative embodiment, the second recesses thus extend only within the dashed lines. In the alternative embodiment, the second recesses 230 are thus smaller. In the same way, in FIG. 4, FIG. 9, FIG. 10, FIG. 11, FIG. 12 and FIG. 14, alternative embodiments with preferred smaller angular extent are represented diagrammatically with dashed lines.

Between the multiplicity of first recesses 211-216 and the multiplicity of second recesses 230, a multiplicity of sprung web-shaped clamping elements 290 are formed, wherein preferably each first recess 211-216 is associated with at least a second recess 230, particularly preferably exactly one second recess 230. The clamping elements 290 are preferably designed as areas of the laminated rotor core 200. Here, a web-shaped clamping element 290 is associated in each case to each of the first recesses 211, 212, 213, 214, 215, 216. In order to clarify and simplify the drawing, only the clamping element associated with the recess 211, which applies a radially outward acting spring force to the associated rotor magnet 221 after their installation, is marked with reference numeral 291.

According to the first embodiment, the multiplicity of clamping elements 290 is designed in the area between the plurality of second recesses 230 and the associated plurality of first recesses 211-216. Correspondingly, the clamping element 291 is formed, for example, between the opening 231 and the recess 211.

However, embodiments are also possible wherein the first recess 211 is arranged in the area between the passage opening 240 and the second recess 231, the second recess 231 is thus arranged farther outward in radial direction than the first recess 211.

For example, the diameter of the laminated rotor core is 22 mm, the extent of the magnets 221 in radial direction is 1.9 mm and in tangential reaction is 7.8 mm. The radial extent of the second recesses 230 in the completely installed state is approximately 0.8 mm. The plate thickness of the plates is 0.35 mm.

FIG. 4 shows an enlarged section 300 of the first rotor plate 311 of FIG. 3, wherein the rotor plate 311 is represented in a relaxed state Z1 without inserted rotor magnet.

The first recess 211 is designed for receiving a rotor magnet 221. The rotor magnet 221 has an extent X in tangential direction and an extent Y in radial direction. The recess 211 preferably has ledges 351 and 352 which fix the rotor magnet in tangential direction or limit its movement in tangential direction. The distance between the ledges 351 and 352 corresponds preferably substantially to the extent X in tangential direction of the rotor magnet 221. An extension of the first recess 211 in radial direction corresponds in sections to the extent Y of the rotor magnet 221 in radial direction.

Laterally, the first recess 211 preferably has a first area 271L and a second area 271R which are not filled by the rotor magnet 221. The first area 271L and the second area 271R lead to a thinning of the webs between the first recesses 211-216. Thereby, cogging is prevented. However, embodiments without the first area 271L and the second area 271R are also possible, wherein the protrusions 351, 352 are then preferably extended up to the radially external wall of the first recess 211.

An extension of the second recess 231 in tangential direction is preferably at least 40% of the extent X of the rotor magnet 221 in tangential direction. In another embodiment, the extent of the second recess 231 in tangential direction is at least 50% of the extent X of the rotor magnet 221 in tangential direction or even at least 66% of the extent X of the rotor magnet 221 in tangential direction. In other embodiments wherein the second recess 231 is farther outward in radial direction than the first recess 211, the extent of the second recess 231 in tangential direction can even be of equal size or greater in comparison to the extent X of the rotor magnet 221 in tangential direction. The extent of the second recess 231 in tangential direction is preferably selected so that the respective adjacent second recesses are at least partially spaced apart in order to achieve a satisfactory spring action. The maximum tangential extent therefore depends on the geometry of the rotor core 200 and the arrangement of the second recesses 231 relative to the first recesses 211.

The clamping element 291 has a first end section 291L and a second end section 291R, which are respectively connected to the remaining area of the rotor plate 311, wherein a central section 291M is provided between the first end section 291L and the second end section 291R.

In the embodiment represented in FIG. 4, the first recess 211 and the second recess 231 have a common central axis 405 which runs through the midpoint of the rotor plate 310. The midpoints of the two recesses therefore lie on a line which passes through the midpoint of the rotor plate 310. The two recesses are mirror symmetrical with respect to the central axis 405, and their axes of symmetry coincide in the form of the central axis. However, embodiments are also conceivable wherein the midpoints of the first recess 211 and of the second recess 231 are shifted against with respect to one another in tangential direction. In the same way, embodiments are conceivable wherein the second recess 231 has a non-mirror symmetrical design. Embodiments with a combination of the mentioned features are also possible.

The rotor magnets 221 are preferably cuboid for manufacturing reasons, but they can also be designed with curvature.

Between the first recess 211 and the second recess 231, which are adjacent in radial direction, a sprung web-shaped clamping element 291 is formed. In the depicted embodiment, the clamping element 291 extends from the first recess 211 to the second recess 231. As can be seen in FIG. 4, the clamping element 291 has a local convexity 292 in radial direction. This convexity 292 locally decreases the radial extent of the first recess 211, which is smaller in the area of the local convexity 292 than the radial extent Y of the rotor magnet 221. In the embodiment represented in FIG. 4, the clamping element 291 is curved outward in radial direction.

The radially farther outward delimitation of the second recess 231 is curved radially outward.

During the introduction of the rotor magnet 221 into the recess 211, the clamping element 291 is elastically deformed in radial direction toward the center of the laminated core 200, so that a resetting force F is generated which acts against the radially internal side of the rotor magnet 221 and applies a radially outward acting spring force to it. Thereby, the rotor magnet 221 is fixed or clamped in radial direction in the recess 211. In the represented embodiment, the clamping element 291 is designed to clamp the rotor magnet 221 in the first recess 211 on the radially internal side of the rotor magnet 221 just in a subsection. However, embodiments are also possible wherein the rotor magnet 221 is clamped on the radially internal side over its entire extent X, in particular also in the case of second recesses 231 which are provided outside of the first recesses 211.

For embodiments wherein the second recess 231 in radial direction is farther outward in radial direction than the first recess 211, the above-described relationships apply analogously, but mirror-inverted, i.e., the clamping element 291 has inward curvature or bulging in radial direction and acts on the external side on the radially external side of the rotor magnet 221.

In the relaxed state Z1, the first recess 211 has a first area F1 and the second recess 231 has a second area F2. During the insertion of the rotor magnet, as shown in FIG. 9, the clamping element 291 transitions into a tensioned state Z2, wherein the first area F1 increases in size and the second area F2 decreases in size. In other words, the ratio of the first area F1 of the first recess 211 to the second area F2 of the second recess 231 is smaller in the relaxed state Z1 than in the tensioned state. Thereby, during the introduction of an associated rotor magnet 221 into the first recess 211, the clamping element 291 can be tensioned toward the second recess 231, and thereby the clamping element 291 applies a force to the associated rotor magnet 221 toward the first recess 211, thus holding the associated rotor magnet 221 in the pocket 210.

FIG. 5 shows, in a top view, a second rotor plate 312 and a first rotor plate 311 arranged underneath, and FIG. 6 shows an enlarged section. The first rotor plate 311 has a first contour and the second rotor plate 312 has a second contour. The contour of the first rotor plate 311 extends into the pocket 210, in the area of the clamping element 291 of the first rotor plate 311. As a result, during the pressing in of a rotor magnet 221 into the pocket 210, the first rotor plate 311 can spring inward, and as a result of this tension, it can apply and hold a pressure on the rotor magnet 221.

FIG. 7 shows the laminated rotor core 200 of FIG. 2 in a longitudinal section, and FIG. 8 shows an enlarged view of a section VIII of FIG. 7.

The centering index recesses 209—if provided at all—preferably do not extend completely through the laminated rotor core 200, since this would lead to unnecessary weakening of the magnetic flux.

The laminated rotor core 200 has three first rotor plates 311. It is advantageous not to use only first rotor plates 311, since due to the second recesses 231, a magnetic resistance to the magnetic flux forms, which decreases the power of the motor.

Between the upper first rotor plate 311 and the first axial end 201 of the laminated rotor core 200, six second rotor plates 312 are arranged, and between the lower first rotor plate 311 and the second axial end 202 of the laminated rotor core 200, six second rotor plates 312 are provided. Investigations have shown that it is advantageous to provide, on the first axial end 201 and on the second axial end 202, in each case at least five second rotor plates 312 (without clamping elements), since this leads to a noise reduction.

For noise reduction, it is advantageous to arrange the first rotor plates 311 symmetrically in the laminated core 200. In the represented laminated rotor core 200 with 57 rotor plates 310, first rotor plates 311 can be provided, for example, in the $7^{th}$ position, in the $29^{th}$ position, and in the $51^{st}$ position, wherein a deviation of the order of magnitude of ±1 does not significantly disturb the symmetry.

The exemplary laminated rotor core 200 has an axial height H=20 mm, a total height h1, h2 of the six second rotor plates 312 at the first axial end 201 and second axial end 202 of h1=2.1 mm and h2=2.15 mm, respectively, and a diameter of 22.5 mm.

In the relaxed state, the clamping elements 291 protrude by 0.125 mm into the pockets 210; in this way, in this area, they protrude beyond the contour of the second rotor plates 312 or partially cover the contour of the first recesses 211 of the second rotor plates 312.

During the pressing of the rotor magnets 221 into the pockets 210, the clamping elements 291 can spring into the associated second recess 231 and thus exert a pressure on the rotor magnets 221 perpendicularly to the axis.

While the deformation of the clamping element 291 that occurs is preferably largely elastic, in areas with much greater deformation, plastic deformation can also occur. After a—usually undesirable—removal of the rotor magnet 221, the clamping element 291 will therefore possibly not spring completely back into the relaxed position.

FIG. 9 shows a section of the first rotor plate 311 of FIG. 3 with the rotor magnet 221 clamped by the clamping element 291 in the recess 211. Due to the pressing in, the rotor plate 311 is in a tensioned state Z2, and the rotor magnet 221 can be fastened firmly in the opening 211. The clamping element 291 is deformed by the rotor magnet 221, so that the extension of the first recess 211 in radial direction over the entire tangential extent X of the rotor magnet 221 corresponds to or is slightly greater than the extent Y of the rotor magnet 221 in radial direction. In FIG. 9, the plastic strain of the clamping element 291 brought about by the rotor magnet 221 is shown. As can be seen in FIG. 9, the maximum plastic strain is approximately 11%, that is to say clearly below the breaking strain of the plate, which is approximately 15%. The maximum loading occurs in the outer end sections 291L, 291R of the clamping element 291 in the areas adjacent to the second recess 231. By comparison, the load in the central section 291M of the clamping element 291 on the side facing the rotor magnet 221 is only half as large.

Due to the deformation of the clamping element 291, a resetting force F is generated, which acts against the radially internal side of the rotor magnet 221 and applies to it a radially outward acting spring force. The clamping element 291 is designed in an embodiment to clamp the rotor magnet 221 in the recess 211 only in sections by means of the associated clamping force F, in order to prevent damage to the usually brittle rotor magnet 221.

In the alternative embodiment of the second recess 231, indicated by the dashed line, the plastic strain looks qualitatively similar, wherein the outer strain areas accordingly occur farther inward.

FIG. 10 shows the section from FIG. 9 and the hydrostatic stress distribution existing therein. It can be seen that in the center area of the clamping element 291, on the side facing the rotor magnet 221, a compressive stress exists, and on the side facing away from the rotor magnet 221, that is to say on the side adjacent to the second recess 231, a tensile stress exists. FIG. 10 also shows that, in the outer marginal areas of the clamping element 291, on the side facing the rotor magnet 221, a tensile stress exists, and on the side facing away from the rotor magnet 221, a compressive stress exists. In the areas of the clamping element 291 with maximum plastic strain, a compressive stress thus exists in each case. Therefore, there is no risk of rupture of material. The maximum magnitude of the plastic strain is determined by the shape, for example, by the radius or the curvature on the outer areas of the clamping element, both radially inward and radially outward. The maximum elongation can also be influenced by the shape of the clamping element (straight or curved: different thicknesses) and by the shape (for example, width) of the second recess, and also by whether said maximum elongation occurs in an area with tensile stress or compressive stress. For the optimization, the change in the shape of the plate can be incorporated in a simulation, and the strain can be calculated. In this way, it is possible to find out whether one shape is better than another shape and whether additional changes lead to improvements.

In the alternative embodiment of the second recess 231 indicated by the dashed line, the hydrostatic stress distribution looks qualitatively similar, wherein the outer compression areas accordingly occur farther inward.

FIG. 11 shows an enlarged section of a second embodiment of a first rotor plate 711 for a laminated rotor core 600. The recesses 611, 631 and the passage opening 640 can be stamped, for example, or cut by laser. The plate laminations 610 can be fastened to one another for the formation of the laminated rotor core 600 in any desired manner, for example, by welding or stamping. Alternatively, instead of the multiplicity of stacked plate laminations 610, it is also possible, for example, to use soft iron or another soft magnetic material for the formation of the laminated rotor core 600.

The enlarged section of the laminated core 600 illustrates in particular the clamping element 691 arranged in the area between the first recess 611 and the second recess 631, in the center part of which, on the side facing away from the second recess 631, a local convexity 692 is present. The convexity 692 locally decreases the radial extension of the first recess 611, so that, in the area of the convexity 692, it is smaller than the radial extent Y of an associated rotor magnet 621.

FIG. 12 shows the section of FIG. 11 with the rotor magnet 621 clamped in the recess 611 by the clamping element 691. By pressing in the rotor magnet 621 in, the clamping element 691 is deflected or deformed.

Due to the deformation of the clamping element 691, a resetting force F is generated, which acts against the radially internal side of the rotor magnet 621 and firmly applies a radially outward acting spring force to it. The clamping element 691 clamps the rotor magnet 621 in the recess 611 only in the area of the convexity 692 by means of the associated clamping force F.

In the alternative embodiment of the second recess 231, which is indicated by the broken line, the deformation looks qualitatively similar, wherein the represented outer areas are not deformed or only slightly deformed, while the inner areas are more deformed. This clearly shows the effect of the smaller second recesses 231 in accordance with the alternative embodiment.

FIG. 13 shows a longitudinal section through the laminated rotor core 200. Preferably, the rotor magnet 221 has a cant or bevel 410 at least on the introduction side, in order to facilitate the introduction 412 into the first recess 211 or to reduce the required maximum press-in force for pressing the rotor magnet 221 and the deflection 432 of the clamping element 291 in. The bevel 410 can be produced for a multiplicity of rotor magnets 221 at the same time, for example, by slide grinding. The force necessary for pressing the rotor magnet 221 in increases, the smaller the radius of the ground edge of the rotor magnet 221 or the local curvature is.

In an embodiment, the margin of the first recess 211 also has a bevel 420. The bevel can be produced during the production of the rotor plate 310 by die roll during the stamping process and can be varied by the width of the stamping tool. The pull-in width 421 is preferably between 10% and 40% of the plate thickness 430, more preferably approximately 30% of the plate thickness 430. The pull-in depth 422 is preferably between 8% and 30% of the plate thickness 430, more preferably approximately 20% of the plate thickness 430. The die roll is represented exaggerated.

The plate thickness 430 is preferably in the range of 0.1 mm to 3.0 mm, more preferably in the range of 0.2 mm to 0.5 mm; in the embodiment example it is preferably 0.35 mm.

During the pressing in of the rotor magnets 221, the pressing force can be monitored, so as to recognize and optionally discard rotor magnets 221 with are seated particularly too loosely.

Advantageously, a minimum press-in force F_min=2 N for each clamping plate 311 is advantageous. A minimum press-in force F_min=4 N or higher can also be specified.

Diagrammatically, from outside (first axial end 201) to inside viewed from outside, a second rotor plate 312 is provided, then a first rotor plate 311 with a clamping element is provided, and then again a second rotor plate 312 is provided. This enables a deflection of the clamping element 291 by the rotor magnet 221, wherein the deflection by the adjacent second rotor plate 312 is guided in a direction perpendicular to the axis of the laminated rotor core 200.

The rotor plates 311, 312 form the laminated rotor core 200 with the at least one pocket 210 for the rotor magnet 221. On an axial end 222, the rotor magnet 221 has a bevel 410 with a pull-in width B1 in radial direction. Before the introduction into the pocket 210, the rotor magnet 221 in radial direction has a maximum oversize O1 relative to the pocket, wherein the following applies:

The ratio of B1 to O1 is in the range of 1.5 . . . 4.0.

This ratio enables a satisfactory introduction of the rotor magnet 221 into the pocket and the rotor magnet does not butt flat against a rotor plate 311, 312.

FIG. 14 shows a section of an additional embodiment of the first rotor plate 311. The rotor magnet 221 is not designed to be cuboid, instead it has a curved cross section. Accordingly, the clamping element is also designed with curvature, wherein, in the relaxed state (without the rotor magnet 221), it extends even further into the first recess 211.

Analogously to FIG. 4, the extent X of the rotor magnet 221 in tangential direction and an extent R2 of the second recess 231 in tangential direction can be indicated here. In the embodiment example, the extent R2 is similar in size to the extent X, wherein R2 is approximately 0.9 X.

FIG. 15 shows an additional embodiment of the first rotor plate 311, wherein the contour of the second recesses 230 has been improved with a view to the occurring tensions and the required press-in forces for the rotor magnets 221. The ratio of the extent R2 of the second recess 230 to the extent X of the rotor magnet 221 to be pressed into the first rotor plate 311 (extent between the shoulders, compare FIG. 4) is approximately 0.5. A ratio of at least 0.4 (correspondingly 40%), preferably at least 0.45, has been found to be generally advantageous. A ratio of at most 1.2, preferably at most 0.9, more preferably at most 0.7, has been found to be advantageous, wherein the ratio can be higher in an arrangement of the second recess 230 radially outside the first recess 211.

In the relaxed state, in the embodiment example, the clamping element 291 extends into the first recess 211 by approximately V=0.15 mm. An increase leads to a stronger clamping action and press-in force, and a reduction leads to a lower clamping action and press-in force. As a result, the clamping element 291 can be adapted to the requirements.

FIG. 16 shows a first rotor plate 311 which is covered by a second rotor plate 312. The clamping element 291 is mostly covered by the second rotor plate 312, and as a result a deformation in axial direction during the pressing in of the rotor magnet is prevented or largely reduced.

FIG. 17 shows the rotor plates 311, 312 in accordance with FIG. 16, wherein the position of the rotor magnet 221 is indicated diagrammatically. While, for example, in FIG. 15 and FIG. 4, the extents in tangential direction were considered, in FIG. 17 the angular extent phi_RM of the rotor magnet 221 and the angular extent phi_R2 of the second recess 230 are considered, wherein the maximum angular extent is considered as angular extent in each case.

In the present case, phi_RM=55° and phi_R2=36°. The ratio phi_R2/phi_RM is thus 0.65.

For the ratio phi_R2/phi_RM, values in the range of 0.4 to 0.8 have been found to be advantageous; more preferably in the range of 0.5 to 0.8. These values are also advantageous for the other embodiment examples.

The embodiments represented in the drawings and described can be characterized as follows.

An internal rotor 150 for an electric motor 100 has a laminated rotor core 200; 600 with a multiplicity of rotor plates 310, which laminated rotor core 200; 600 has a multiplicity of pockets 210, in which pockets 210 a rotor magnet 221; 621 is arranged at least partially in each case, which rotor plates have first recesses 211; 611 for the formation of the pockets 210, which rotor plates 310 have at least a first rotor plate 311, which first rotor plate 311 has at least a second recess 231-236; 631, which second recess 231-236; 631 is associated with a first recess 211-216; 611, wherein between the second recess 231-236; 631 and the associated first recess 211-216; 611, a sprung web-shaped clamping element 291; 691 is formed, which clamping element 291; 691 is tensioned by the associated rotor magnet 221, 621 toward the second recess 231-236; 631, and which clamping element 291; 691 thereby applies a force to the associated rotor magnet 221; 621 toward the first recess 211-216; 611 in order to hold the associated rotor magnet 221; 621 in the pocket 210. The ratio of the angular extent phi_R2 of the second recess 230 to the angular extent phi_RM of the associated rotor magnet 221 is in the range of 0.4 to 0.8, preferably in the range of 0.5 to 0.8. In this range, the distribution of the stresses can be achieved particularly satisfactorily, and, at the same time, a sufficient holding force can be generated. Targeted investigations using the FEM method (finite element method) have shown that the tension in the rotor plate increases when the ratio decreases and this can lead to a defect during the insertion of the rotor magnets. On the other hand, the holding force for the rotor magnets decreases when the ratio increases and this can lead to a poor hold of the rotor magnet, or a very large number of rotor plates with clamping element have to be used. The range of 0.4 to 0.5 has been found to be advantageous for very large internal rotors. For smaller, medium-size and larger internal rotors, the range of 0.5 to 0.8 is advantageous, wherein, in an optimized embodiment, a value of 0.65 was particularly preferable.

According to a preferred embodiment, the second recess 231-236; 631 is adjacent to the first recess 211-216; 611 in radial direction. Thereby, the clamping element 291 can spring satisfactorily into the second recess in radial direction.

According to a preferred embodiment, the clamping element 291 separates the first recess 211-216; 611 and the second recess 231-236; 631 within the first rotor plate 311 completely from one another. This increases the stability of the clamping element 291 and enables a greater stress buildup.

According to a preferred embodiment, the second recess 231; 631 and the associated first recess 211; 611 have a common central axis. Thereby, a more uniform stress distribution in the clamping element 291 can be achieved.

According to a preferred embodiment, the extent of the second recess 231; 631 in tangential direction is at least 40% of the extent of the rotor magnet 221; 621 in tangential direction, preferably at least 45%. Thereby, a satisfactory distribution and a limitation of the stress generated in the clamping element 291 can be achieved.

According to a preferred embodiment, the clamping element 291; 691 has a first end section 291L and a second end section 291R, which are respectively connected to the remaining area of the rotor plate 311, wherein a central section 291M is provided between the first end section 291L and the second end section 291R. Thereby, the clamping element is integrated in the rotor plate and can work together with the rotor plate at the two ends as part of the rotor plate.

According to a preferred embodiment, on the clamping element 291; 691, a compressive stress exists due to the tensioning or deflection toward the second recess 231-236; 631, in the central section 291M of the clamping element 291; 691, at least in sections on the side facing the rotor magnet 221, and, on the side facing away from the rotor magnet 221, a tensile stress exists. Due to this arrangement of the compressive stress and tensile stress, a force can be generated on the rotor magnets.

According to a preferred embodiment, on the clamping element 291; 691, due to the tensioning toward the second recess 231-236; 631, in the first end section 291L and in the second end section 291R of the clamping element 291; 691, a tensile stress exists on the side facing the rotor magnet 221, and a compressive stress exists on the side facing away from the rotor magnet 221. This arrangement of the stresses enables a satisfactory buildup of the opposite stresses in the central area.

According to preferred embodiment, on the side facing the first recess 211-216; 611, the central section 291M is designed with convex curvature at least in sections. Thereby, even in the tensioned state of the clamping element, the force between the rotor magnet and the clamping element can be maintained.

According to a preferred embodiment, on the side facing the second recess 231-236; 631, the central section 291M is designed with concave curvature at least in sections. Thereby, a complete pressing of the clamping element into the second area can be counteracted, and higher stresses can be built up.

According to a preferred embodiment, the central section 291M has a protrusion which protrudes into the first recess 211-216; 611. This enables a concentrated force exertion onto the rotor magnet and thereby a higher contact pressure.

According to a preferred embodiment, the rotor magnet 221; 621 has a first side facing the clamping element 291; 691, and, in the tensioned state, the clamping element 291; 691 has a shape which is not exactly complementary to the shape of the first side, thereby clamping the rotor magnet 221; 621 in the first recess 211; 611 on the first side only in a subsection.

According to a preferred embodiment, the clamping element 291; 691 extends from the first recess 211; 611 to the second recess 231; 631. Thus, no additional intermediate recesses are provided.

According to a preferred embodiment, the rotor core 200 has a passage opening 240 for receiving a shaft 40, and the second recess 231 is arranged in the area between the passage opening 240 and the associated first recess 211. As a result, the rotor magnets can be arranged close to the external periphery of the rotor and a greater magnetic flux can be generated thereby.

According to a preferred embodiment, the clamping element 291; 691 has a local convexity 292; 692 in radial direction. This leads to an increase of the holding pressure onto the rotor magnet.

According to a preferred embodiment, the first rotor plate 311 has a first contour, and the rotor plates 310 have at least a second rotor plate 312, which second rotor plate 312 has a second contour, wherein the second contour covers the first contour in the area of the second recess 231 at least in sections. Thereby, in the area of the second rotor plates, more material is present, and thus the magnetic resistance of the laminated core is decreased overall.

According to a preferred embodiment, the second rotor plate 312 covers the clamping element 291; 691 at least partially, thus limiting, in the case of an arrangement of the second rotor plate 312 on the first rotor plate 311, a movement of the clamping element 291; 691 of the first rotor plate 311 in an axial direction toward the second rotor plate 312, while allowing a movement of the clamping element 291; 691 in a direction perpendicular to the radial direction. Thereby, the risk of an axial bending of the clamping element is reduced, and the neighboring rotor plate is used as radial guide.

According to a preferred embodiment, the rotor magnet 221; 621 has a first side facing the clamping element 291; 691, and the clamping element 291; 691 of the first rotor plate covers the contour of the second rotor plate 312 partially, thus applying a greater pressure onto the first side of the rotor magnet 221; 621 by the clamping element 291; 691 of the first rotor plate 311 than by the second rotor plate 312.

According to a preferred embodiment, the first rotor plate 312 has a second rotor plate 312 on one side or on both sides. Thereby, the magnetic resistance can be decreased, and, in the case of guiding by the second rotor plates, a guiding in both axial directions can be brought about.

According to a preferred embodiment, on an axial end or on the two axial ends of the laminated rotor core 200; 600, at least five second rotor plates 312 are provided before a first rotor plate 311 is provided. It has been shown that, by providing the clamping in the interior of the internal rotor, the noises generated by the motor can be reduced.

According to a preferred embodiment, the laminated rotor core 200; 600 comprises at least two first rotor plates 311, wherein preferably at most six first rotor plates 311 are provided. Depending on the size of the internal rotor, these values have been found to be advantageous. In the case of a single first rotor plate, noise has arisen, since, due to the securing at only one axial height, the rotor magnet can go into oscillation.

According to a preferred embodiment, the first rotor plate 312 has at least a clamping element 291; 691 for each first recess 211-216. The clamping elements are thus used for all the rotor magnets.

According to a preferred embodiment, an electric motor 100 has an external stator 28 and an internal rotor 150 as described.

According to a preferred embodiment, the rotor magnet 221, on an axial end 222, has a bevel with a pull-in width B1 in radial direction, and, before the introduction into the pocket 210, the rotor magnet 221 has a maximum oversize O1 in radial direction relative to the pocket, wherein the following applies:

The ratio of B1 to O1 is in the range of 1.5 . . . 4.0. This ratio enables a satisfactory introduction of the rotor magnet 221 into the pocket, and the rotor magnet does not butt flat against a rotor plate 311, 312.

Also described is a rotor plate 311 for holding a rotor magnet 221 in a pocket 210 of a laminated rotor core 200; 600, which rotor plate 311 has first recesses 211-216; 611 for the formation of the pockets 210 and at least a second recess 231-236; 631, which second recess 231-236; 631 is associated with a first recess 211-216; 611 and adjacent to the latter in radial direction, wherein a sprung web-shaped clamping element 291; 691 is formed between the second recess 231-236; 631 and the associated first recess 211-216; 611, which clamping element 291; 691 has a relaxed state Z1 and a tensioned state Z2, wherein, in the relaxed state, the ratio of the first area F1 of the first recess 211-216; 611 to the second area F2 of the second recesses 231-236; 631 is smaller than in the tensioned state, which, during the introduction of an associated rotor magnet 221 into the first recess 211-216; 611, brings about a transition of the clamping element 291; 691 from the relaxed state Z1 into the tensioned state Z2, in that the clamping element is tensioned by the associated rotor magnet 221 toward the second recess 231-236; 631, and the clamping element 291; 691 thereby applies a force to the associated rotor magnet 221 towards the first recess 211-216; 611 in order to hold the associated rotor magnet 221 in the pocket 210. Such a first rotor plate can be used for producing an internal rotor with the corresponding advantages.

According to a preferred embodiment, the clamping element 291; 691 has a first end section 291L and a second end section 291R, which are respectively connected to the remaining area of the rotor plate 311, wherein a central section 291M is provided between the first end section 291L and the second end section 291R. Thereby, the clamping element is integrated in the rotor plate, and at the two ends it can work together with the rotor plate as part of the rotor plate.

According to a preferred embodiment, relaxed state Z1, the central section 291M is designed with convex curvature at least in sections on the side facing the first recess 211-216; 611. Thereby, the contact surface is reduced and the contact pressure onto the rotor magnet is increased. In addition, a satisfactory spring action of the clamping element can be achieved.

According to a preferred embodiment, in the relaxed state Z1, the central section 291M, on the side facing the second recess 231-236; 631 is designed with concave curvature at least in sections. Thereby, a complete pressing of the clamping element into the second area is counteracted and greater stresses can build up.

According to a preferred embodiment, the central section 291M has a protrusion which protrudes into the first recess 211-216; 611. This enables a concentrated force application onto the rotor magnet and thus a higher contact pressure.

According to a preferred embodiment, additional rotor plates 310 are associated with the rotor plate for the formation of a laminated rotor core 200; 600 with at least a pocket 210, laminated rotor core 200; 600 with which a rotor magnet 221 is associated for being arranged in the pocket 210, which rotor magnet 221, on an axial end 222, has a bevel with a pull-in width B1 in radial direction, wherein the rotor magnet 221 before the introduction into the pocket 210 in radial direction has a maximum oversize O1 relative to the pocket, wherein the following applies:

The ratio of B1 to O1 is in the range of 1.5 ... 4.0. This ratio enables a satisfactory introduction of the rotor magnet 221 into the pocket, and the rotor magnet does not butt flat against a rotor plate 311, 312.

Naturally, numerous developments and modifications are possible within the context of the present invention.

Thus, instead of the roller bearing, a sintered bearing can also be used, for example.

The first recess 211 and the second recess 230 can also be arranged asymmetrically with respect to one another. Thus, for example, the second recess 230 can easily be provided offset in circumferential direction with respect to the first recess 211.

The advantages of the electric motor according to the invention include that it can also be implemented with small dimensions, that the tolerances of the shaft/laminated core interference fit assembly have no influence on the securing of the rotor magnets and that in the laminated core only small plastic strains occur, so that there is no risk of breaking of the material. Due to the simple design of the laminated core, the tool costs for producing the plates for the laminated core are moreover low.

The invention claimed is:

1. An internal rotor (150) for an electric motor (100),
which internal rotor (150) has a laminated rotor core (200; 600) with a multiplicity of rotor plates (310), which laminated rotor core (200; 600) has multiple pockets (210) in each of which a rotor magnet (221; 621) is at least partially arranged,
which rotor plates have first recesses (211; 611) for forming the pockets (210),
which rotor plates (310) have at least a first rotor plate (311),
which first rotor plate (311) has at least a second recess (230; 231-236; 631), which second recess (230; 231-236; 631) is associated with a first recess (211-216; 611), wherein the ratio of the angular extent (phi_R2) of the second recess (230; 231-236; 631) to the angular extent (phi_RM) of the associated rotor magnet (221; 621) is in the range of 0.4 to 0.8,
wherein, between the second recess (230; 231-236; 631) and the associated first recess (211-216; 611), a sprung web-shaped clamping element (291; 691) is formed, which clamping element (291; 691) is tensioned toward the second recess (231-236; 631) by the associated rotor magnet (221; 621), and which clamping element (291; 691) as a result applies a force to the associated rotor magnet (221; 621) toward the first recess (211-216; 611) in order to hold the associated rotor magnet (221; 621) in the pocket (210),
wherein the first rotor plate (311) has a first contour, wherein the rotor plates (310) have at least a second rotor plate (312), which second rotor plate (312) has a second contour, wherein the second contour covers the first contour in the area of the second recess (231) at least in sections, and
wherein the second rotor plate (312) at least partially covers the clamping element (291; 691), in order to limit in this manner, in an arrangement of the second rotor plate (312) on the first rotor plate (311), a movement of the clamping element (291; 691) of the first rotor plate (311) in an axial direction toward the second rotor plate (312), while however allowing a movement of the clamping element (291; 691) in a direction perpendicular to the axial direction.

2. The internal rotor (150) according to claim 1, wherein the ratio of the angular extent (phi_R2) of the second recess (230; 231-236; 631) to the angular extent (phi_RM) of the associated rotor magnet (221; 621) is in the range of 0.5 to 0.8.

3. The internal rotor (150) according to claim 1,
wherein the second recess (231-236; 631) is adjacent to the first recess (211-216; 611) in radial direction.

4. The internal rotor (150) according to claim 1,
wherein the clamping element completely separates from one another the first recess (211-216; 611) and the second recess (231-236; 631) within the first rotor plate (311).

5. The internal rotor (150) according to claim 1,
wherein the second recess (231; 631) and the associated first recess (211; 611) have a common central axis.

6. The internal rotor (150) according to claim 1,
wherein the extent of the second recess (231; 631) in tangential direction is at least 40% of the extent of the rotor magnet (221; 621) in tangential direction.

7. The internal rotor (150) according to claim 1,
wherein the rotor magnet (221; 621) has a first side facing the clamping element (291; 691), and
wherein the clamping element (291; 691) in the tensioned state has a shape which is not exactly complementary to the shape of the first side, in order to hereby clamp the rotor magnet (221; 621) in the first recess (211; 611) on the first side just in a partial area.

8. The internal rotor (150) according to claim 1, wherein the clamping element (291; 691) extends from the first recess (211; 611) to the second recess (231; 631).

9. The internal rotor (150) according to claim 1, wherein the rotor core (200) has a passage opening (240) for receiving a shaft (40), and wherein the second recess (231) is arranged in the area between the passage opening (240) and the associated first recess (211).

10. The internal rotor (150) according to claim 1, wherein the clamping element (291; 691) has a local convexity (292; 692) in radial direction.

11. The internal rotor (150) according to claim 1, wherein the first rotor plate (312) has a second rotor plate (312) on one side or on both sides.

12. The internal rotor (150) according to claim 1, wherein, on one axial end or the two axial ends of the laminated rotor core (200; 600), at least five second rotor plates (312) are provided before a first rotor plate (311) is provided.

13. The internal rotor (150) according to claim 1, wherein the laminated rotor core (200; 600) has a number n of first rotor plates (311) chosen from 2≤n≤6.

14. The internal rotor (150) according to claim 1, wherein the first rotor plate (312) has for each first recess (211-216) at least a clamping element (291; 691).

15. An electric motor (100) with an external stator (28) and an internal rotor (150) according to claim 1.

16. The internal rotor (150) according to claim 1, wherein the extent of the second recess (231; 631) in tangential direction is at least 45% of the extent of the rotor magnet (221; 621) in tangential direction.

17. The internal rotor (150) according to claim 1, wherein the clamping element (291; 691) has a first end section (291L) and a second end section (291R), which are each connected to a remaining area of the rotor plate (311), wherein a central section (291M) is provided between the first end section (291L) and the second end section (291R).

18. The internal rotor (150) according to claim 17, wherein, on the clamping element (291; 691), due to the tensioning toward the second recess (231-236; 631), in the central section (291M) of the clamping element (291; 691), at least in sections on the side facing the rotor magnet (221), a compressive stress exists, and, on the side facing away from the rotor magnet (221), a tensile stress exists.

19. The internal rotor (150) according to claim 17, wherein, on the clamping element (291; 691), due to the tensioning toward the second recess (231-236; 631), in the first end section (291L) and in the second end section (291R) of the clamping element (291; 691), a tensile stress exists on the side facing the rotor magnet (221), and a compressive stress exists on the side facing away from the rotor magnet (221).

20. The internal rotor (150) according to claim 17, wherein, on the side facing the first recess (211-216; 611), the central section (291M) is designed with convex curvature at least in sections.

21. The internal rotor (150) according to claim 17, wherein, on the side facing the second recess (231-236; 631), the central section (291M) is designed with concave curvature at least in sections.

22. The internal rotor (150) according to claim 17, wherein the central section (291M) has a protrusion (692) which protrudes into the first recess (211-216; 611).

23. An internal rotor (150) for an electric motor (100), which internal rotor (150) has a laminated rotor core (200; 600) with a multiplicity of rotor plates (310), which laminated rotor core (200; 600) has multiple pockets (210) in each of which a rotor magnet (221; 621) is at least partially arranged,
which rotor plates have first recesses (211; 611) for forming the pockets (210),
which rotor plates (310) have at least a first rotor plate (311),
which first rotor plate (311) has at least a second recess (230; 231-236; 631), which second recess (230; 231-236; 631) is associated with a first recess (211-216; 611), wherein the ratio of the angular extent (phi_R2) of the second recess (230; 231-236; 631) to the angular extent (phi_RM) of the associated rotor magnet (221; 621) is in the range of 0.4 to 0.8,
wherein, between the second recess (230; 231-236; 631) and the associated first recess (211-216; 611), a sprung web-shaped clamping element (291; 691) is formed, which clamping element (291; 691) is tensioned toward the second recess (231-236; 631) by the associated rotor magnet (221, 621), and which clamping element (291; 691) as a result applies a force to the associated rotor magnet (221; 621) toward the first recess (211-216; 611) in order to hold the associated rotor magnet (221; 621) in the pocket (210), and
wherein the first rotor plate (311) has a first contour,
wherein the rotor plates (310) have at least a second rotor plate (312), which second rotor plate (312) has a second contour, wherein the second contour covers the first contour in the area of the second recess (231) at least in sections, and
wherein the rotor magnet (221; 621) has a first side facing the clamping element (291; 691),
in which internal rotor (150) the clamping element (291; 691) of the first rotor plate partially covers the contour of the second rotor plate (312), in order to exert in this manner a higher pressure on the first side of the rotor magnet (221; 621) by the clamping element (291; 691) of the first rotor plate (311) than by the second rotor plate (312).

24. An internal rotor (150) for an electric motor (100), which internal rotor (150) has a laminated rotor core (200; 600) with a multiplicity of rotor plates (310), which laminated rotor core (200; 600) has multiple pockets (210) in each of which a rotor magnet (221; 621) is at least partially arranged,
which rotor plates have first recesses (211; 611) for forming the pockets (210),
which rotor plates (310) have at least a first rotor plate (311),
which first rotor plate (311) has at least a second recess (230; 231-236; 631), which second recess (230; 231-236; 631) is associated with a first recess (211-216; 611), wherein the ratio of the angular extent (phi_R2) of the second recess (230; 231-236; 631) to the angular extent (phi_RM) of the associated rotor magnet (221; 621) is in the range of 0.4 to 0.8,
wherein, between the second recess (230; 231-236; 631) and the associated first recess (211-216; 611), a sprung web-shaped clamping element (291; 691) is formed, which clamping element (291; 691) is tensioned toward the second recess (231-236; 631) by the associated rotor magnet (221, 621), and which clamping element (291; 691) as a result applies a force to the associated rotor magnet (221; 621) toward the first recess (211-216; 611) in order to hold the associated rotor magnet (221; 621) in the pocket (210), and
wherein the rotor magnet (221), before the introduction into the pocket (210), has in radial direction a maximum oversize O1 relative to the pocket, wherein the following applies:
the ratio of B1 to O1 is in the range of 1.5 to 4.0.

* * * * *